(12) United States Patent
Law et al.

(10) Patent No.: US 10,220,350 B2
(45) Date of Patent: Mar. 5, 2019

(54) MEMBRANE FILTRATION MODULE (71) Applicant: NANYANG TECHNOLOGICAL UNIVERSITY, Singapore (SG)

(72) Inventors: Wing-Keung Adrian Law, Singapore (SG); Tian Li, Singapore (SG); Anthony Gordon Fane, Singapore (SG)

(73) Assignee: NANYANG TECHNOLOGICAL UNIVERSITY, Singapore (SG)

( * ) Notice: Subject to any disclaimer, the term of this patent is extended or adjusted under 35 U.S.C. 154(b) by 337 days.

(21) Appl. No.: 15/035,104

(22) PCT Filed: Nov. 10, 2014

(86) PCT No.: PCT/SG2014/000526
§ 371 (c)(1),
(2) Date: May 6, 2016

(87) PCT Pub. No.: WO2015/069190
PCT Pub. Date: May 14, 2015

(65) Prior Publication Data
US 2016/0279576 A1    Sep. 29, 2016

Related U.S. Application Data

(60) Provisional application No. 61/901,609, filed on Nov. 8, 2013.

(51) Int. Cl.
*B01D 63/16* (2006.01)
*B01D 63/02* (2006.01)
(Continued)

(52) U.S. Cl.
CPC ............. *B01D 63/16* (2013.01); *B01D 63/02* (2013.01); *B01D 65/08* (2013.01); *C02F 3/1273* (2013.01);
(Continued)

(58) Field of Classification Search
CPC .............................. B01D 63/16; B01D 63/02
(Continued)

(56) References Cited

U.S. PATENT DOCUMENTS 4,220,489 A * 9/1980 Coplan ................. B01D 53/22
156/166
5,151,191 A * 9/1992 Sunaoka ................ B01D 65/02
210/321.8

(Continued)

FOREIGN PATENT DOCUMENTS

| CN | 1191768 A | 9/1998 |
| CN | 101791501 A | 8/2010 |
| WO | 2015069190 A1 | 5/2015 |

OTHER PUBLICATIONS

Drews, Anja, "Membrane fouling in membrane bioreactors-Characterisation, contradictions, cause and cures", Journal of Membrane Science. 2010, 363, 1-28. Elsevier B.V. pp. 1-28.
(Continued)

*Primary Examiner* — Ellen M McAvoy (57) ABSTRACT

A membrane filtration module configured for use in a filtration reactor, the module comprising: hollow fiber membranes configured to perform filtration of feed fluid in the reactor; and a vibration mechanism configured to vibrate the hollow fiber membranes to generate shear stresses on the surface of the hollow fiber membranes for reducing fouling of the hollow fiber membranes.

13 Claims, 11 Drawing Sheets

(51) Int. Cl.
  *B01D 65/08* (2006.01)
  *C02F 3/12* (2006.01)

(52) U.S. Cl.
  CPC .. *B01D 2321/2058* (2013.01); *C02F 2303/20* (2013.01)

(58) Field of Classification Search
  USPC ......................................................... 210/650
  See application file for complete search history.

(56) References Cited

U.S. PATENT DOCUMENTS

| | | | |
|---|---|---|---|
| 5,480,553 A | 1/1996 | Yamamori et al. | |
| 6,322,398 B1* | 11/2001 | Fladung | H01R 13/512 439/660 |
| 2005/0023207 A1* | 2/2005 | Kirker | B01D 63/00 210/321.74 |
| 2005/0023219 A1* | 2/2005 | Kirker | B01D 63/08 210/636 |
| 2005/0077227 A1* | 4/2005 | Kirker | B01D 63/02 210/321.69 |
| 2006/0138037 A1* | 6/2006 | Yang | B01D 29/72 210/223 |
| 2007/0029258 A1* | 2/2007 | Takeda | B01D 63/02 210/650 |
| 2010/0116736 A1* | 5/2010 | Wiemers | B01D 61/022 210/636 |
| 2010/0258492 A1* | 10/2010 | Kang | B01D 63/02 210/232 |
| 2013/0153493 A1 | 6/2013 | Young et al. | |
| 2014/0241956 A1* | 8/2014 | Page | G01N 1/4077 422/534 |
| 2015/0251141 A1* | 9/2015 | Mourad | B01D 65/08 210/636 |
| 2015/0328587 A1* | 11/2015 | Moon | B01D 63/02 210/323.1 |

OTHER PUBLICATIONS

Li, Tian, et al., "Fouling control of submerged hollow fibre membranes by vibrations", Journal of Membrane Science. 2013, 427, 230-239. Elsevier B.V. pp. 230-239.

Wicaksana, Filicia, et al., "Fibre movement induced by bubbling using submerged hollow fibre membranes", Journal of Membrane Science. 2006, 271, 186-195. Elsevier B.V. pp. 186-195.

Xia, Lijun, et al., "Hydrodynamic effects of air sparging on hollow fiber membranes in a bubble column reactor", Water Research. 2013, 47, 3762-3772. Elsevier Ltd. pp. 3762-3772.

Chinese Office Action dated Feb. 27, 2018, CN Application No. 201480059698.2, filed on Nov. 8, 2013.

Foreign Communication From a Related Counterpart Application, International Search Report and Written Opinion dated Dec. 15, 2014, International Application No. PCT/SG2014/000526 filed on Nov. 10, 2014.

* cited by examiner

MEMBRANE FILTRATION MODULE

CROSS-REFERENCE TO RELATED APPLICATIONS

The present application is a filing under 35 U.S.C. 371 as the National Stage of International Application No. PCT/SG2014/000526, filed Nov. 10, 2014, entitled "A MEMBRANE FILTRATION MODULE," which claims the benefit of and priority to U.S. Provisional Patent Application No. 61/901,609, filed Nov. 8, 2013, both of which are incorporated herein by reference in their entirety for all purposes.

FIELD OF THE INVENTION

This invention relates to a membrane filtration module, and in particular to a membrane filtration module using hollow fibre membranes with fouling control.

BACKGROUND OF THE INVENTION

A membrane is a thin, film-like structure that can be used to separate two fluids. In a filtration module, it acts as a selective barrier, allowing some particles or chemicals to pass through, but not others. During membrane filtration, contaminants in the feed water are accumulated on the membrane surface when the permeate passes through the membrane, which leads to an increase of membrane filtration resistance. This is referred to as membrane fouling, and is a major factor for consideration in designing membrane bioreactors (MBRs).

Surface hydrodynamic shear stresses can remove foulants from the membrane surface, thereby alleviating the problem of membrane fouling. Surface shear stress can be generated by relative movement between the membrane and the adjacent fluid. Currently, air sparging is used extensively for this objective in aerobic MBRs (AMBRs). Similarly, biogas sparging is used in anaerobic MBRs (AnMBRs) to remove membrane foulants. However, the flux improvement by air or biogas sparging can be limited (Xia et al. 2013) and its energy consumption can be as high as 70% of the total cost (Judd 2006; Drews 2010). In addition, biogas sparging for AnMBRs poses a critical operational issue since the biogas production can be unstable, and the increase of biogas concentration inside the fluid in the reactor may decrease the anaerobic digestion rates and thus reduce the production of biogas for energy recovery.

SUMMARY OF INVENTION

The present invention comprises a vibration-stirring (VS) membrane module system that enables highly efficient and low cost submerged hollow fibre membrane filtration. The membrane filtration system or module is configured for use in a reactor and contains a bundle of hollow fibre membrane module therewithin. The module comprises a vibration mechanism so that it can undergo lateral vibration at various frequencies and amplitudes. The two ends of the bundle of hollow fibres are anchored to the module, which may comprise four sides surfaces around the length of the hollow fibres. Of the four side surfaces, three are preferably kept entirely open to allow free passage of the reactor fluid to the membrane, while one has a special panel that is designed for turbulence generation and stirring. Upon vibration, the panel induces turbulence to reduce fouling on the membrane surface, and also stirs the reactor fluid to enhance circulation and prevent the build-up of stagnation regions inside the reactor. The results from an experimental study showed that the hollow fibre membrane fouling was reduced with this system and the performance was also better than just vibrating the hollow fibres without the panel. The results also showed that the vibrating panel stirred the reactor fluid to the extent that the mixed liquor remained suspended without providing an extra stirrer inside the reactor.

According to a first exemplary aspect, there is provided a membrane filtration module configured for use in a filtration reactor, the module comprising: hollow fibre membranes configured to perform filtration of feed fluid in the reactor; and a vibration mechanism configured to vibrate the hollow fibre membranes to generate shear stresses on the surface of the hollow fibre membranes for reducing fouling of the hollow fibre membranes.

The membrane filtration module may further comprise a panel provided parallel to the hollow fibre membranes and configured to be vibrated by the vibration mechanism to generate turbulence in the feed fluid for reducing fouling of the hollow fibre membranes.

The panel may further be configured to be vibrated by the vibration mechanism to generate turbulence for homogenizing the feed fluid such that a stirring apparatus is eliminated from the reactor.

The panel may comprise a projecting hanger plate on each of two opposing edges of the panel, each hanger plate being configured for connecting the panel to the vibration mechanism and to the ends of the hollow fibre membranes.

The panel may be at a distance of 5 cm from the hollow fibre membranes for fouling control.

The vibration mechanism may be configured to generate transverse vibrations in the panel.

The vibration mechanism may be configured to generate transverse vibrations in the hollow fibre membranes.

The vibration mechanism may comprise a vibration bar configured to transmit vibrations generated by an external vibration drive to the membrane filtration module.

Opposite ends of the fibres of the hollow fibre membranes in the membrane filtration module may be placed at a distance apart that is less than the actual length of the fibres such that a looseness is provided in the fibres.

The reactor may be one of: an anaerobic membrane bioreactor and an aerobic membrane bioreactor. According to a second exemplary aspect, there is provided a method of membrane filtration, the method comprising: vibrating hollow fibre membranes in a reactor while passing feed fluid through the hollow fibre membranes such that shear stresses are generated on the surface of the hollow fibre membranes for reducing fouling of the hollow fibre membranes.

Fouling of the hollow fibre membranes may be further reduced by vibrating a panel provided parallel to the hollow fibre membranes while passing the feed fluid through the hollow fibre membranes.

The method may further comprise homogenizing the feed fluid to eliminate a stirring apparatus from the reactor by vibrating the panel.

The panel may be vibrated with a transverse vibration.

The hollow fibre membranes may be vibrated with a transverse vibration.

BRIEF DESCRIPTION OF FIGURES

In order that the invention may be fully understood and readily put into practical effect there shall now be described by way of non-limitative example only exemplary embodi

DETAILED DESCRIPTION

Exemplary embodiments of the invention will be described with reference to FIGS. 1 to 19.

Figure 1:
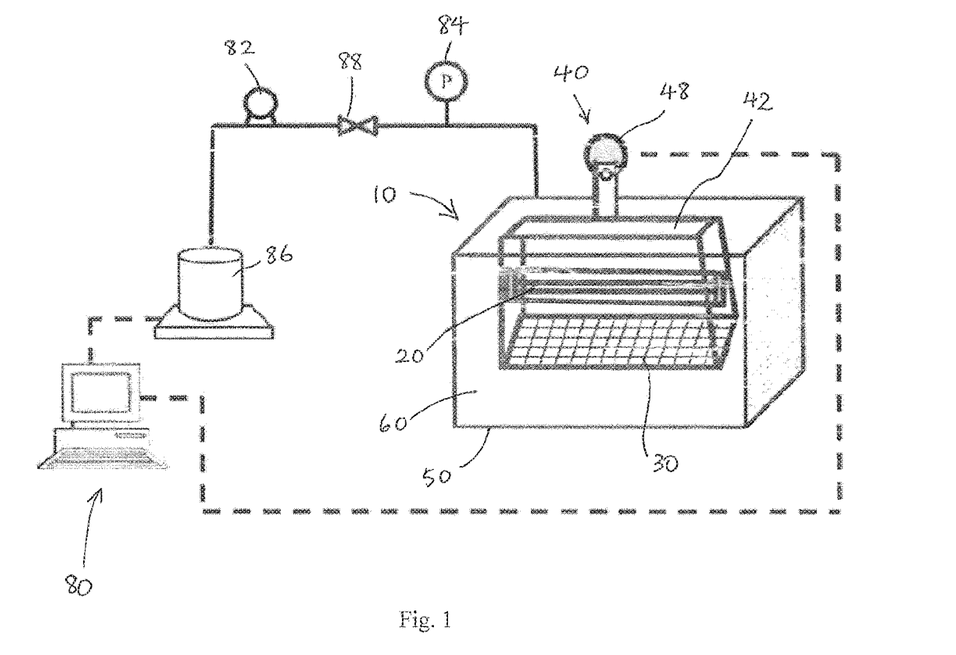
- FIG. 1 is a schematic illustration of an exemplary embodiment of a membrane filtration module of the present invention in an experimental filtration set-up.
Figure 2:
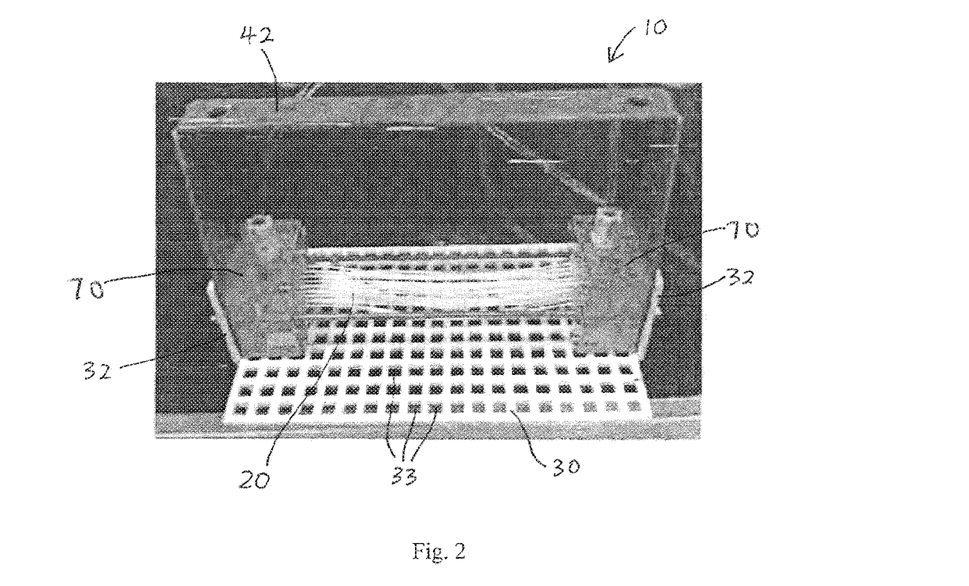
FIG. 2 is a photograph of the membrane filtration module of FIG. 1.

As shown in FIGS. 1 and 2, the membrane filtration module 10 comprises filtration membranes 20 comprising a bundle or skein of hollow fibres, and a vibration mechanism 40 to vibrate the hollow fibre membranes 20. The module 10 preferably also comprises a panel 30 configured to be vibrated adjacent the membranes 20. In use, the module 10 is placed inside a reactor or tank 50 containing a feed fluid 60 such as a feed suspension which is to be filtered by the hollow fibre membranes 20.

In the preferred embodiment, each end 24 of the bundle of hollow fibres 20 is attached to an end holder plate 22. Each end holder plate 22 has the ends 24 of the hollow fibres 20 centrally secured thereon. In the experimental module 10 shown in FIG. 2, the ends 24 of the hollow fibres were glued with araldite epoxy to the end holder plate 22. The hollow fibre ends 24 are preferably regularly spaced apart on the end holder plate 22. Additional holes 25 may be provided adjacent opposite edges of each end holder plate 22 to allow the end holder plate 22 to be secured to the vibration mechanism 40 and the panel 30. The skein of hollow fibres in the membranes 20 may be of a type used in a solid-liquid separation process of choice, and more generally, in various separation processes. Preferably, the skein is specifically adapted for use in microfiltration or ultrafiltration processes to remove large particles of suspensions, usually from used water. For the hollow fibre membranes 20, the fibres can be densely or sparsely packed. For the densely packed fibres, there is a flux competition which conversely reduces the permeate flow. For sparsely packed fibres, there is an inefficient space use which also reduces the permeate flow. Vibration of the membranes 20 can be done either longitudinally (i.e. along the fibre length) or transversely (i.e. perpendicular to the fibre length).

Figure 3:
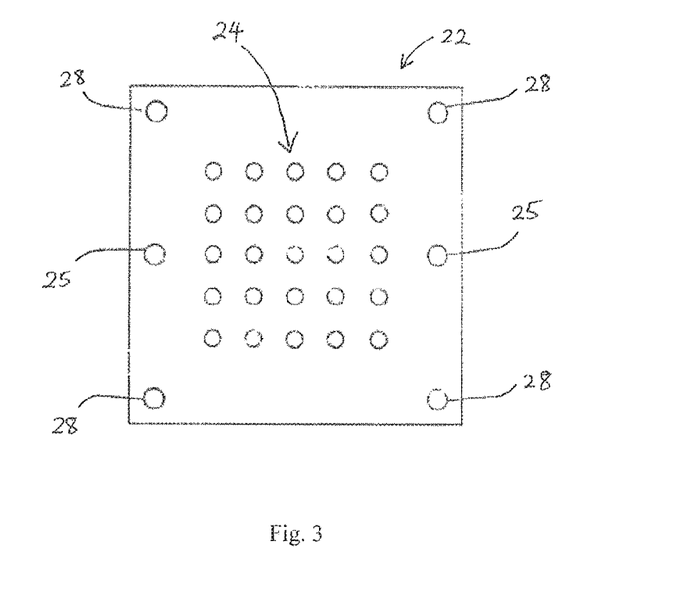
FIG. 3 is a schematic diagram of an end holder plate of anchoring hollow fibre membranes of the membrane filtration module of FIG. 2.
Figure 4:
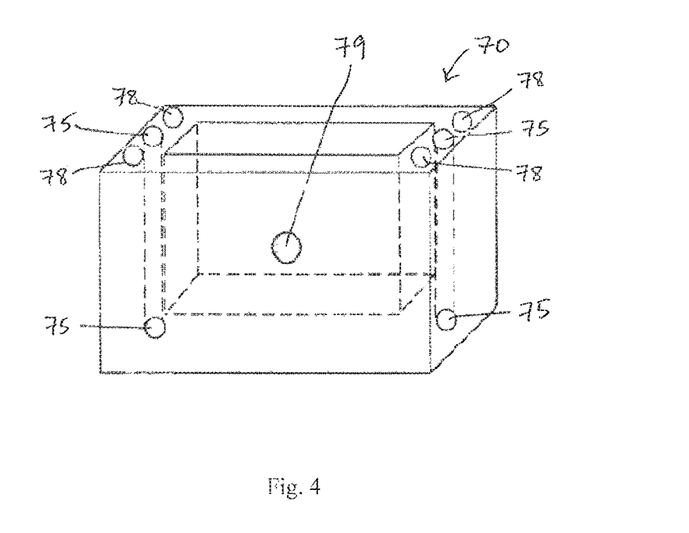
FIG. 4 is a schematic diagram of a water container of the membrane filtration module of FIG. 2.

For verifying the efficacy of the filtration module 10, in an exemplary experimental embodiment of the end holder plate 22 which may have a square, planar structure as shown in FIG. 3, mounting holes 28 were provided at each corner of the end holder plate 22 to allow the end holder plate 22 to be secured to a water container 70 shown in FIG. 4. An O-ring (not shown) may be used when connecting the end holder plate 22 to the water container 70. The water container 70 is configured to collect water from the hollow fibre membranes 20 or permeate that has been filtered by the membranes 20. Attachment holes 78 may be provided on the water container 70 for securing with the mounting holes 28 of each end holder plate 22 by known means such as nuts and bolts, while further holes 75 may be provided for securing the panel 30 to the water container 70. The water container 70 is preferably provided with a drawing out hole 79 that may be fitted with a tubing for drawing out permeate water from the membranes 20 so that a dead end filtration is generated.

Figure 5:
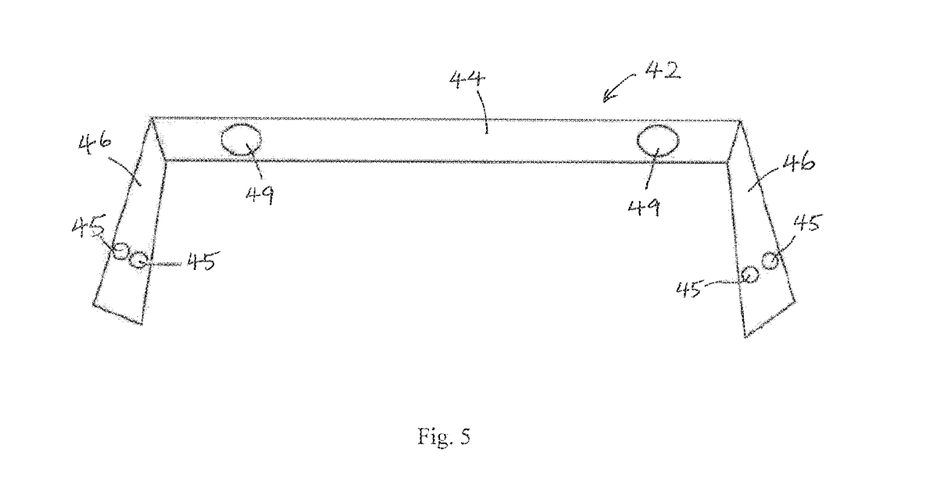
FIG. 5 is a schematic diagram of a vibration bar of a vibration mechanism of the membrane filtration module of FIG. 2.

The vibration mechanism 40 is provided to drive lateral vibration of various amplitudes and frequencies. The vibration mechanism 40 preferably comprises a C-shaped holder or vibration bar 42 as shown in FIG. 5. The vibration bar 42 has a central shoulder 44 configured to be connected to a vibration driving apparatus provided outside the reactor 50. Each end of the shoulder 44 has a projecting hanger ear 46 that is configured to be attached to the holder plate 22 of the membranes 20 so that the vibration bar 42 can transmit vibrations to the membranes 20. To that end, holes 45 are provided on each hanger ear 46 for securing the corresponding holes 25 of the end holder plate 22 thereto by known means such as nuts and bolts, while holes 49 are centrally provided on the shoulder 44 for external connection between the vibration driving apparatus (not shown) and the module 10.

Figure 6:
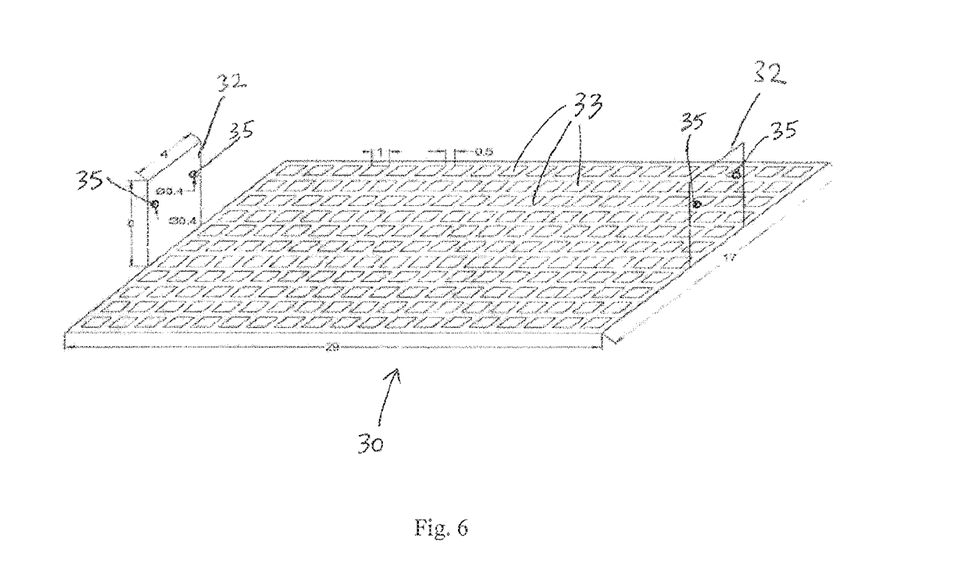
FIG. 6 is a schematic diagram of a panel of the membrane filtration module of FIG. 2.

During vibration of the membranes 20, shear stresses are generated on the surface of the membranes 20 by the relative motion between the membranes 20 and the feed fluid 60, and these shear stresses can reduce the concentration polarization and remove the fouling deposit on the membrane surface. As the motion is mechanically controlled, the shear stresses generated on the surface of the membranes 20 can be an order of magnitude higher (with sufficient frequency and amplitude) than those generated by air or biogas sparging. With transverse vibrations, vortices could be generated that increase shear on the membrane surface. At the same time, the operational energy consumption with vibration can be much less than gas sparging due to the fact that only the fluid inside the boundary layer next to the membrane surface is mobilized for vibration, as opposed to the entire fluid inside the reactor with gas sparging (Li et al. 2013).

Where a vibrating panel 30 is provided, the panel 30 preferably has a rectilinear, planar form, and preferably comprises a structural net element with multiple holes 33 therethrough. The multiple holes 33 are preferably provided in the panel 30 as square holes 33 in a regular, grid-shaped pattern. The panel 30 may thus also be referred to as a grid panel 30 as shown in FIG. 6. In the exemplary experimental embodiment of the panel 30 shown in FIG. 6, the panel 30 has a size of 29 cm×17 cm with a total of 19×11 or 209 square holes, each hole having a size of 1 cm×1 cm, and the gap between neighbouring holes being 0.5 cm. The holes 33 provided in the panel 30 reduce splash of the feed suspensions 60, compared to using a solid panel.

On each of two opposing edges of the panel 30 there is preferably provided a projecting hanger plate 32. Each hanger plate 32 plate is configured for being attached to each of the end holder plates 22 to which the filtration membranes 20 is secured, thereby connecting the bundle of hollow fibres 20 to the panel 30 so that the panel 30 is provided adjacent the hollow fibre membranes 20 and parallel to the hollow fibre membranes 20. Accordingly, holes 35 may be provided on each hanger plate 32 for securing the corresponding holes 25 of the end holder plate 22, by known means such as nuts and bolts.

When the hanger plates 32 of the panel 30 are attached to the end holder plate 22 securing the membranes 20, the panel 30 is thus provided on only one side along the length of the bundle of hollow fibres 20, leaving all other sides of the membranes 20 unobstructed so that the reactor fluid 60 has an open path to approach the membranes 20 for filtration to take place. Preferably, the panel 30 is provided at a distance of about 5 cm from the membranes 20, although it is envisaged that the panel may be placed anywhere between 0 to 100 cm from the membranes 20, depending on the scale and size of the module 10, in order to have a fouling control effect on the membranes 20.

Each hanger plate 32 of the panel 30 is configured to be also secured to the hanger ear 46 of the C-shaped holder or vibration bar 42 of the vibration mechanism, for example, via the holes 35 in the hanger plate 32 of the panel 30 and the holes 45 provided on each hanger ear 46 of the vibration bar 42. In this way, the vibration mechanism 40 can simultaneously transmit vibrations to both the filtration membranes 20 and the panel 30. In addition, the holes 35 in the hanger plate 32 of the panel 30 may also be used to secure the panel 30 to the holes 75 of the water container 70.

The panel 30 is preferably aligned perpendicularly to the direction of vibration. Upon oscillation, the panel 30 acts as both a vibration device that can maintain a high filtration flux of the membranes 20 by reducing membrane fouling as well as a stirring device that can suspend the mixed liquor or fluid 60 inside the reactor 50 to homogenize the feed suspension 60.

The panel 30 is specially designed for the generation of turbulence to reduce the fouling of the hollow fibre membrane 20 inside the module 10 as well as to stir and mix the reactor fluid, while the end holder plates 22 anchor the position of the hollow fibres 20 relative to the panel 30. The pattern of the panel 30 is unique, and the distance between the panel 30 and the membrane bundle 20 is quantitatively determined, as described in greater detail below, so that the filtration membranes 20 benefits from the turbulence generated by the panel 30 in the most optimal manner.

Vibration of the membrane filtration module 10 thus induces turbulence to reduce fouling on the membrane surface, and also stirs the reactor fluid 60 to enhance circulation and prevent building up of stagnant regions near the membrane bundle 20 and inside the reactor 50. With this invention, the use of air or biogas bubbling with its associated equipment can be eliminated entirely.

The materials of the various components 20, 30, 40 of the membrane filtration module 10 should be rigid and able to withstand the reactor environment for a long period without producing any harmful product. For example, standard steel may be used for the vibration bar 42.

Experimental Studies

To study and verify the efficacy of the membrane filtration module 10, the experimental set-up as shown in FIG. 1 comprising the experimental embodiment of the module 10 shown in FIG. 2 was used.

From experimental studies described in greater detail below, it was found that fouling of the hollow fibre membranes 20 was reduced when performing filtration with longer, loose hollow fibre membranes 20 under transverse vibrations. It was also found that the vibrating panel 30 reduced membrane fouling, stirred the reactor fluid 60 and mobilized the fluid 60 to circulate, so that the feed suspension remained suspended and no extra stirring apparatus was required.

Experimental Membrane Module Configuration

Figure 7:
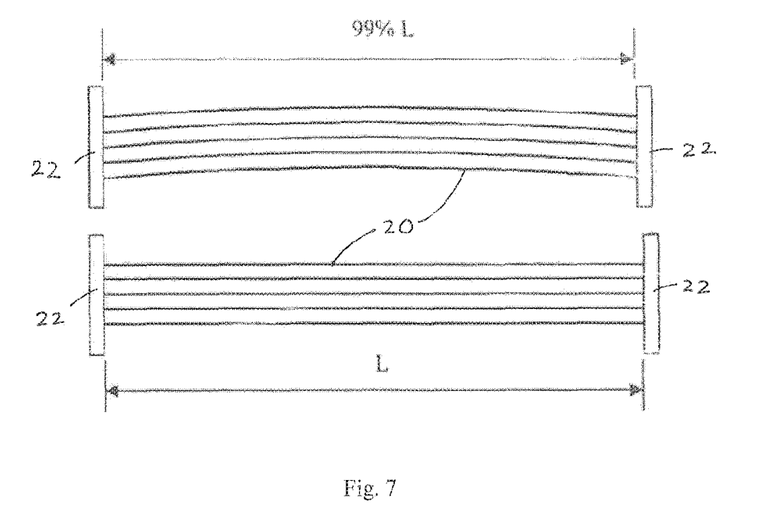
FIG. 7 is schematic illustration of fibre looseness of the hollow fibre membranes of the membrane filtration module of FIG. 2.

In the experimental set-up as shown in FIG. 1 used for all the experiments conducted and described below, the membrane bundle 20 consisted of a group of 5×5 PAN hollow fibre membranes 20 with a spacing of 5 mm, a spacing used in most of the experiments. The length of the fibres 20 was 18 cm with a small degree of 1% looseness, as illustrated in FIG. 7, where 99% L refers to the membranes being positioned in the module 10 such that the ends of the fibres define a distance that is 99% of the length L of the fibres when taut.

Looseness is thus defined as the distance of two ends of the fibres 20 in the module 10 over the total actual length of the fibres 20 (Wicaksana et al. 2006). In the experiments conducted, a maximum of 2% looseness was tested.

The hollow fibre membranes 20 were horizontally positioned, glued with Araldite epoxy to the end holder plates 22 and fixed to the water container 70 for collecting the permeate. Both sides of the water container 70 were connected to the effluent side. The experimental embodiment of the panel 30 described above with reference to FIG. 6 was attached to and positioned at about 5 cm below the hollow fibre membranes 20.

In the experimental set-up, the membrane filtration module 10 was placed in a tank or reactor 50 having dimensions of 600 mm (L)×500 mm (W)×600 mm (H). A brush-less DC motor (BXM 6200-A, Oriental Motor Co., Ltd) 48 was connected to the panel 30 via the vibration mechanism 40 with a crank moving mechanism which vibrated the grid panel 30 and the hollow fibre membranes 20 up and down (vertically) to make lateral sinusoidal movement. Since the hollow fibre membranes 20 and the panel 30 were horizontally positioned to the vibrating setup 40, with this vertical movement, a transverse vibration of the hollow fibre membranes 20 was obtained.

In the experiments conducted, the vibration amplitudes varied from 5 mm to 28 mm, and the vibration frequency was adjusted from 0 to 10 Hz. The permeate filtration was controlled by a data logging system 80 comprising a customized filtration software, a permeate pump 82, a pressure sensor 84 and a digital balance 86, as well as a valve 88 preceding the permeate pump 82 to control flow rate. The permeate flow was controlled by the data logging system 80 and the experiments were run at a constant permeate flux operation, while the pressure values were recorded by the pressure sensor 84.

Experimental Membrane and Feed Suspension Used

The hollow fibre membranes used in the experiments were manufactured by Singapore Ultrapure Pte. Ltd. The fibres were Polyacrylonitrile (PAN) microfiltration membranes. Hollow fibre membranes with inner/outer diameters of 1 mm/1.6 mm with a nominal pore size of 0.1 □m were used. The pure water permeability of the fibres was 2.04 L/m² h kPa.

Four feed suspensions were used in the experiments:
 i. 4 g/L Bentonite (obtained from Sigma-Aldrich Singapore) suspension,
 ii. 4 g/L yeast suspensions (commercially purchased LevureSeche de Boulanger),
 iii. 4 g/L mixed liquor (collected from Ulu Pandan Water Reclamation Plant, Singapore) and
 iv. 8 g/L mixed liquor (collected from Ulu Pandan Water Reclamation Plant, Singapore).

The average particle diameter of Bentonite, yeast and mixed liquor was 5.83 □m, 4.95 □m and 52.51 □m respectively.

After filtration in Bentonite suspension, the hollow fibre membranes were backwashed with Milli-Q water at 20 mL/min for 20 minutes.

After filtration in yeast suspensions, the hollow fibre membranes were soaked with 1% enzyme detergent solution for 15 minutes, rinsed with Milli-Q water, followed by the same Milli-Q water backwash. After filtration in mixed liquor suspension, the hollow fibre membranes were soaked with 0.2% sodium hypochlorite and 0.2% citric acid for 2 hours, and the same Milli-Q water backwash operation procedures.

The measurements of water permeability after washing suggested that the membranes could be re-used as their permeability can be restored.

Assessment of the Membrane Filtration Characteristics

In the experimental studies conducted, transmembrane pressure (TMP) values and the average fouling rate (dTMP/dt) were used as the main filtration parameter to evaluate membrane performance.

Figure 8:
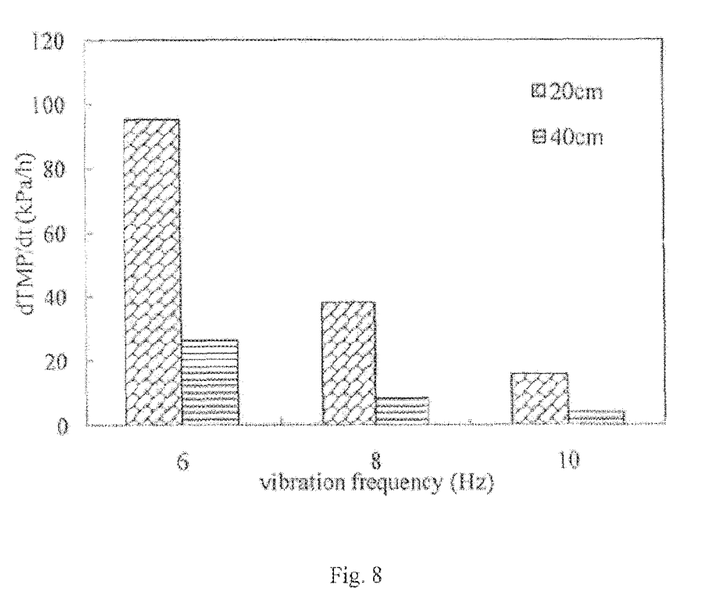
FIG. 8 is a graph of fouling rate of an experimental membrane filtration module using different lengths of fibres with longitudinal vibration.

Referring to FIGS. 8 to 13 which show results of experiments conducted without the grid panel 30, in one study, fouling rate between different lengths of fibre curtains or different lengths of hollow fibres in the membranes 20 was explored under longitudinal vibration. To achieve a longitudinal vibration, the vibration bar 42 was rotated 90° to make a vertical orientation. Two fibre curtains, one with a length of 20 cm, and the other one with a length of 40 cm were vibrated longitudinally from frequencies of 6 to 10 Hz in 4 g/L Bentonite suspensions. As shown in FIG. 8, the 20 cm fibres induced a fouling rate of 95.4 kPa/h at 6 Hz and 15.8 kPa/h at 10 Hz, while the 40 cm fibres induced 26.6 and 3.8 kPa/h fouling rates, respectively. This confirms that longer fibres perform better with vibrations in submerged membrane systems due to the fact that the longer fibres have the potential to induce more additional lateral movement and thus reduce membrane fouling.

Figure 9A:
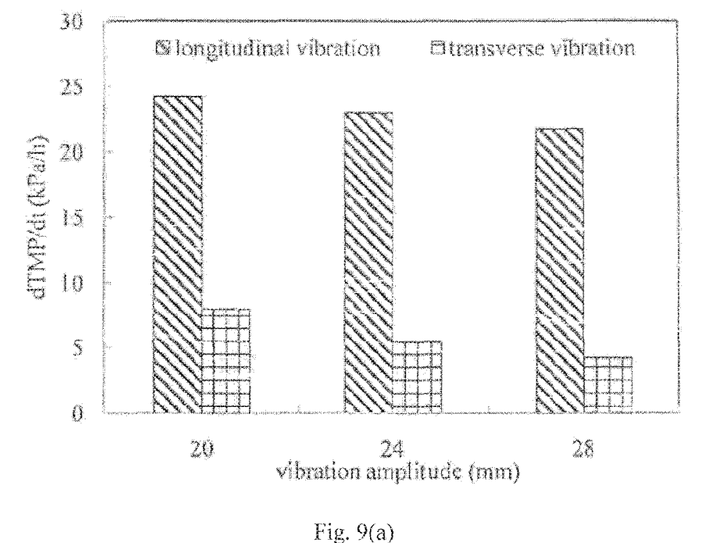
FIG. 9(a) is a graph of fouling rate of an experimental membrane filtration module under transverse and longitudinal vibration at different vibration amplitudes in a Bentonite suspension for 18 cm long fibres.
Figure 9B:
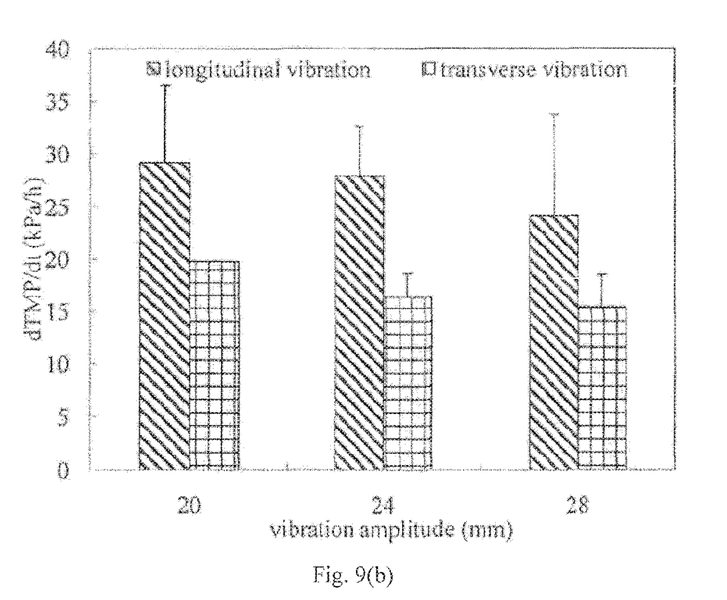
FIG. 9(b) is a graph of fouling rate of an experimental membrane filtration module under transverse and longitudinal vibration at different vibration amplitudes in a yeast suspension for 18 cm long fibres.

Another study compared longitudinal and transverse vibration performance. To make the comparison consistent, the centre position of the horizontal and vertical orientation of the taut fibres in the membranes 20 were kept identical and a same vibration frequency of 1 Hz was used, together with a constant permeate flux of 25 LMH. As shown in FIG. 9(*a*), with longitudinal vibration amplitude of 20 mm in 4 g/L Bentonite suspension, the fouling rate was 24.2 kPa/h, while there was only 8 kPa/h fouling rate with transverse vibration, When the vibration amplitude further increased to 28 mm, there was 21.8 and 4.2 kPa/h fouling rate with longitudinal and transverse vibration, respectively. Similar results were also found in 4 g/L yeast suspensions, as can be seen in FIG. 9(*b*). With such a small frequency of 1 Hz, comparable improvement was already achieved by transverse vibration over longitudinal vibration. This poses a significant energy cost reduction for real industry application.

Figure 10A:
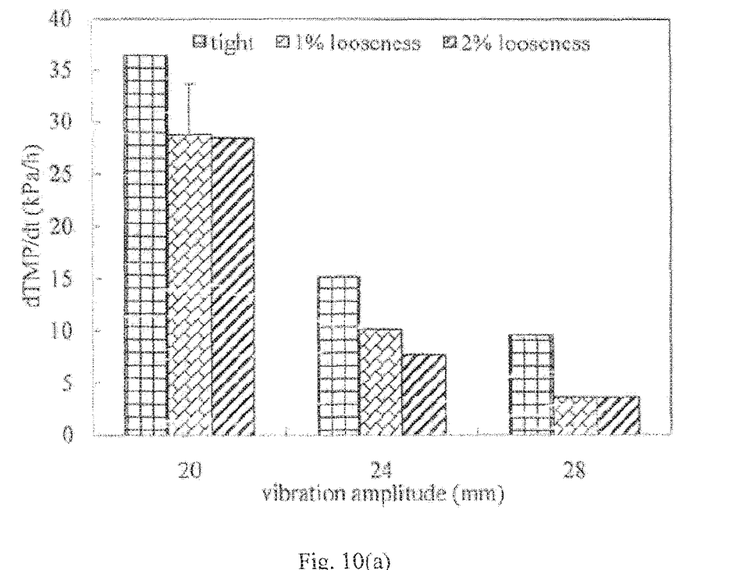
FIG. 10(a) is a graph of fouling rate of an experimental membrane filtration module using taut and loose fibres at different vibration amplitudes in a Bentonite suspension.
Figure 10B:
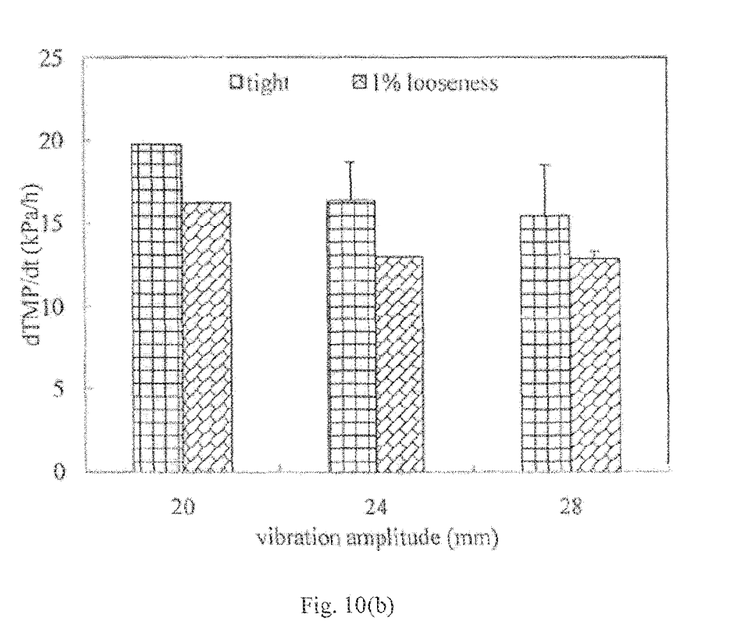
FIG. 10(b) is a graph of fouling rate of an experimental membrane filtration module using taut and loose fibres at different vibration amplitudes in a yeast suspension.

The effect of tightness or tautness of the membrane fibres (as discussed above with reference to FIG. 7) on the filtration ability of the membrane filtration module 10 was also studied. With a vibration amplitude of 24 mm in 4 g/L Bentonite suspension and constant flux of 30 LMH, a fouling rate of 15.2 kPa/h was induced by tight or taut fibres, while fouling rate was reduced to 10.2 kPa/h with 1% looseness fibres 20, and further reduced to 7.8 kPa/h with 2% looseness of the fibres 20, as shown in FIG. 10(*a*). In 4 g/L yeast suspension at constant flux rate of 25 LMH, 19.8 kPa/h fouling rate was induced by taut 18 cm long fibres 20, while there was only fouling rate of 16.2 kPa/h with 1% loose fibres 20 under the vibration amplitude of 20 mm, as shown in FIG. 10(*b*). Other amplitudes were also investigated and similar trends were observed, can be seen in FIGS. 10(*a*) and 10(*b*). From all these values, it can be seen that some additional improvement could be achieved with a small fibre looseness of 1% to 2% with transverse vibrations. This would save energy as more membrane fouling could be reduced with small degree of fibre looseness under transverse vibrations.

Figure 11:
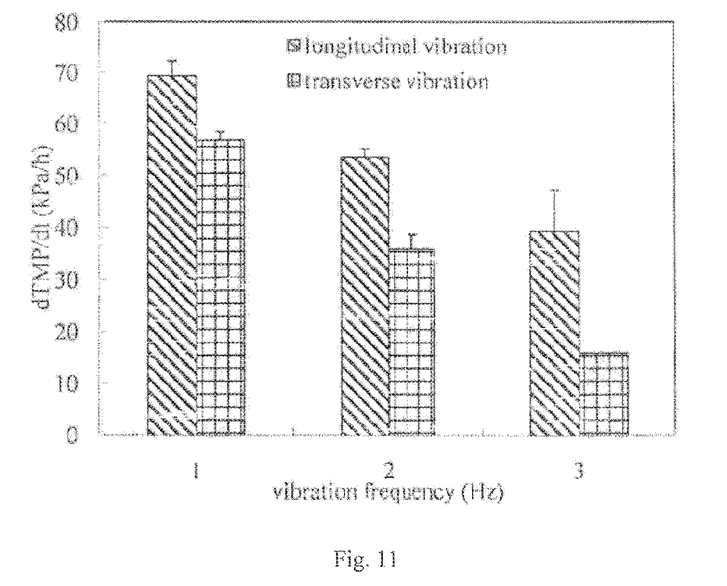
FIG. 11 is a graph of fouling rate of an experimental membrane filtration module under transverse and longitudinal vibration at different vibration amplitudes in a yeast suspension for 16 cm long fibres.

Results from a further experiment to compare longitudinal and transverse vibrations are shown in FIG. 11, where small frequencies of 1 to 3 Hz with longitudinal and transverse vibrations with 1% looseness fibres were conducted in 4 g/L yeast suspensions at constant permeate flux of 25 LMH and vibration amplitude of 16 mm. For the same loose fibres, with a vibration frequency of 2 Hz, there was 53.6 kPa/h fouling rate with longitudinal vibrations, while there was a much smaller fouling rate of 36.1 kPa/h with transverse vibrations. With a higher vibration frequency of 3 Hz, there were 39.4 kPa/h and 16 kPa/h fouling rates with longitudinal and transverse vibrations, respectively. The results further confirm that transverse vibration with loose fibres is optimal in submerged hollow fibre membrane filtration.

Figure 12:
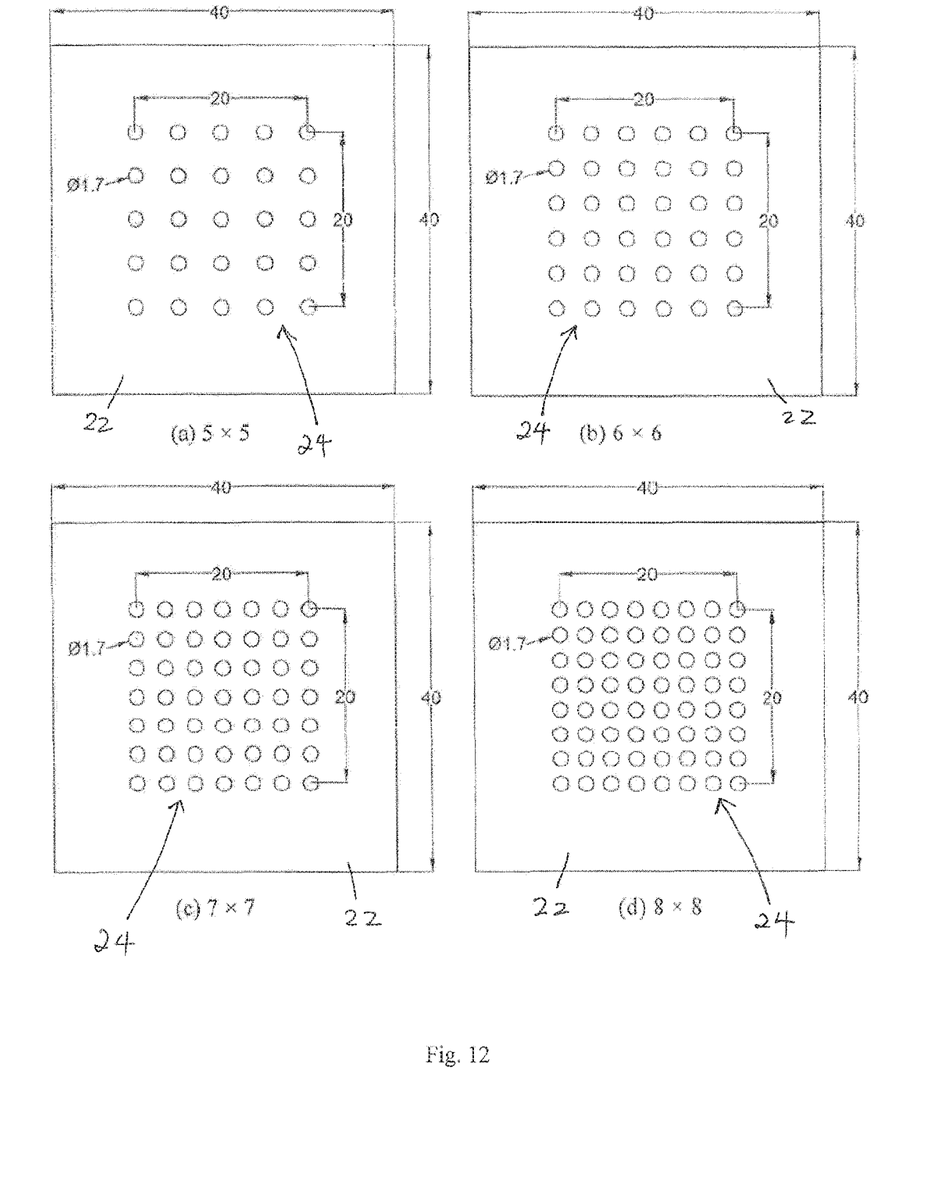
FIG. 12 is a schematic diagram of end holder plates having different fibre layouts that were used for experiments conducted to study the effect of fibre packing density on fouling rate.
Figure 13:
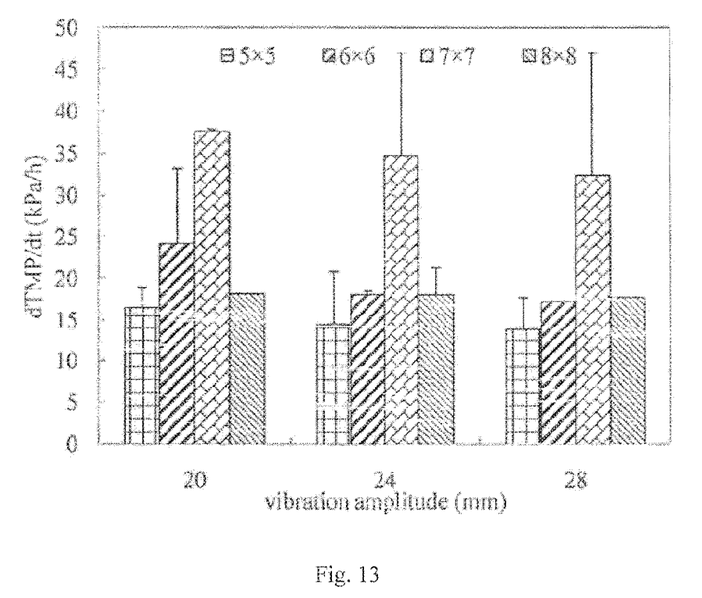
FIG. 13 is a graph of fouling rate of an experimental membrane filtration module using fibres of different packing densities.

Experiments to study the effect of packing densities of the membrane fibres were conducted. FIG. 12 shows four fibre layouts used in the packing densities experiment. With fibre layouts of 5×5, 6×6, 7×7 and 8×8 bundles per membranes 20, packing densities of 14%, 20%, 28% and 36% were obtained respectively. Fouling rates of the 1% looseness membranes 20 having the different packing densities of 14%, 20%, 28% and 36% (using fibre layouts of 5×5, 6×6, 7×7 and 8×8 bundles) with transverse vibrations in 4 g/L yeast suspensions can be seen in FIG. 13, for different vibration amplitudes. For a vibration amplitude of 20 mm, vibration frequency of 2 Hz and constant flux of 25 LMH, the fouling rate increased from 16.5 kPa/h to 24.2 kPa/h when the packing density increased from 14% to 20%. Fouling rate further increased to 37.6 kPa/h when the packing density increased to 28%. However, there was a drop in fouling rate to 18.2 kPa/h when the packing density further increased to 36%. Similar trends were also found with the vibration amplitudes of 24 and 28 mm. This drop indicated that there was an optimal packing density of fibres that would enhance permeate flow and decrease energy consumption when performing filtration with vibration.

Figure 14:
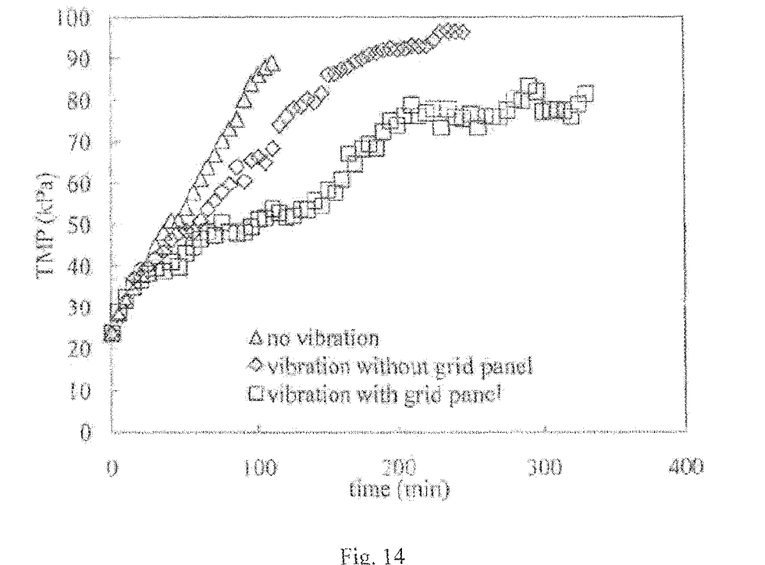
FIG. 14 is a graph of TMP of an experimental membrane filtration module under different continuous vibration conditions with and without a vibrating panel in a yeast suspension.
Figure 15:
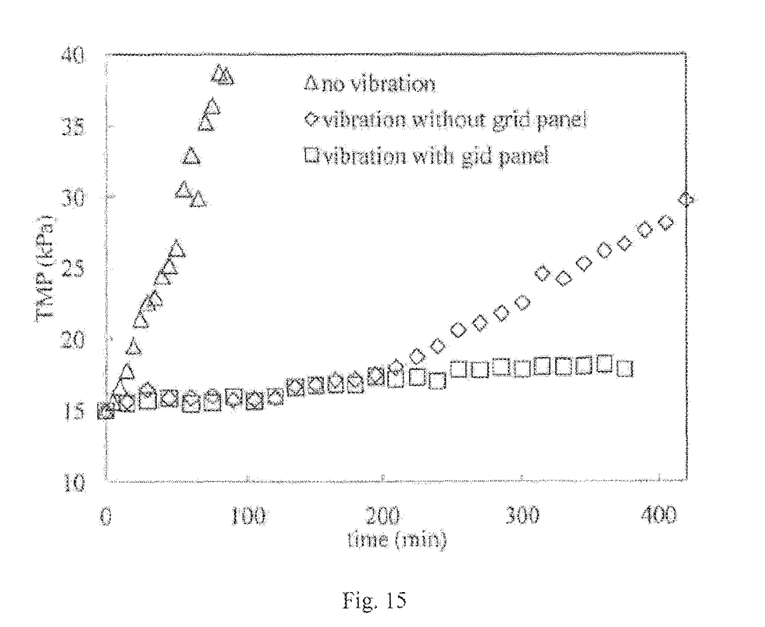
FIG. 15 is a graph of TMP of an experimental membrane filtration module under different continuous vibration conditions with and without a vibrating panel in 4 g/L mixed liquor.
Figure 16:
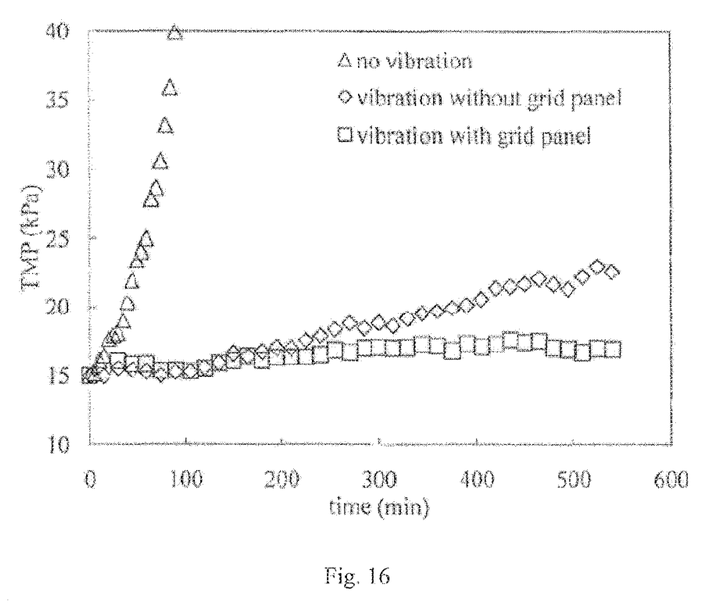
FIG. 16 is a graph of TMP of an experimental membrane filtration module under different continuous vibration conditions with and without a vibrating panel in 8 g/L mixed liquor.
Figure 17:
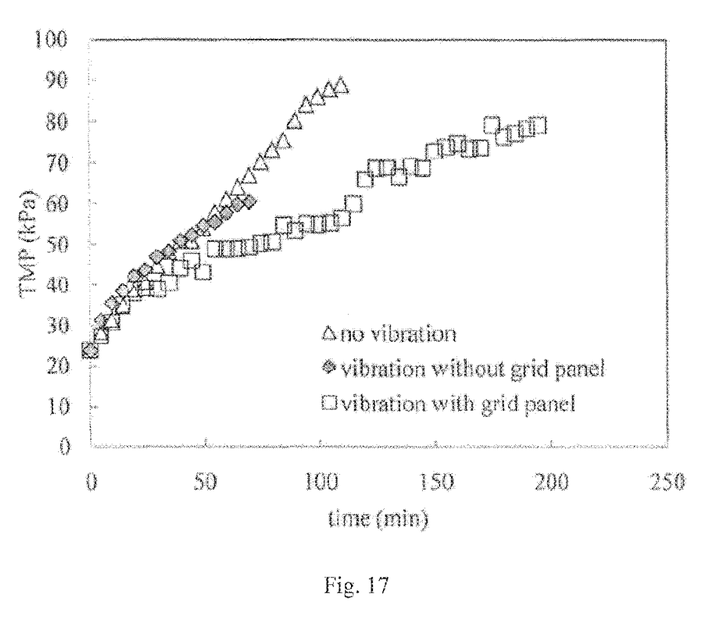
FIG. 17 is a graph of TMP of an experimental membrane filtration module under different vibration relaxation conditions with and without a vibrating panel in a yeast suspension.
Figure 18:
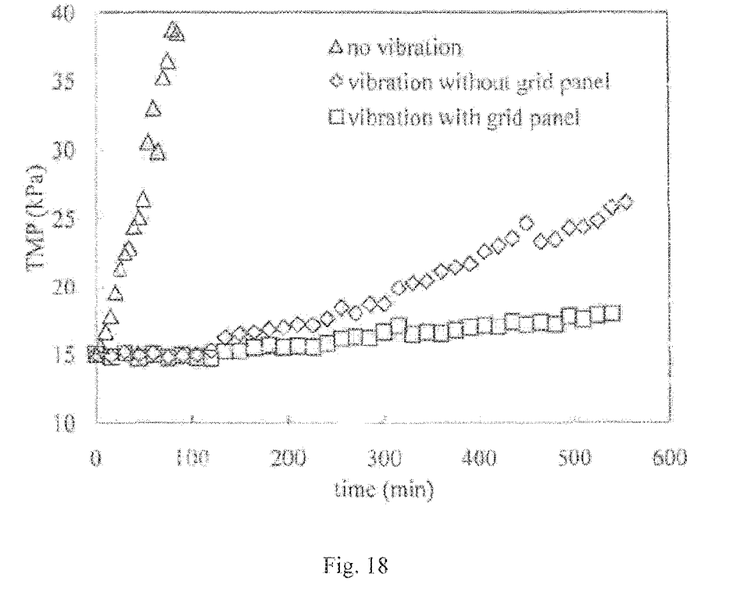
FIG. 18 is a graph of TMP of an experimental membrane filtration module under different vibration relaxation conditions with and without a vibrating panel in 4 g/L mixed liquor.
Figure 19:
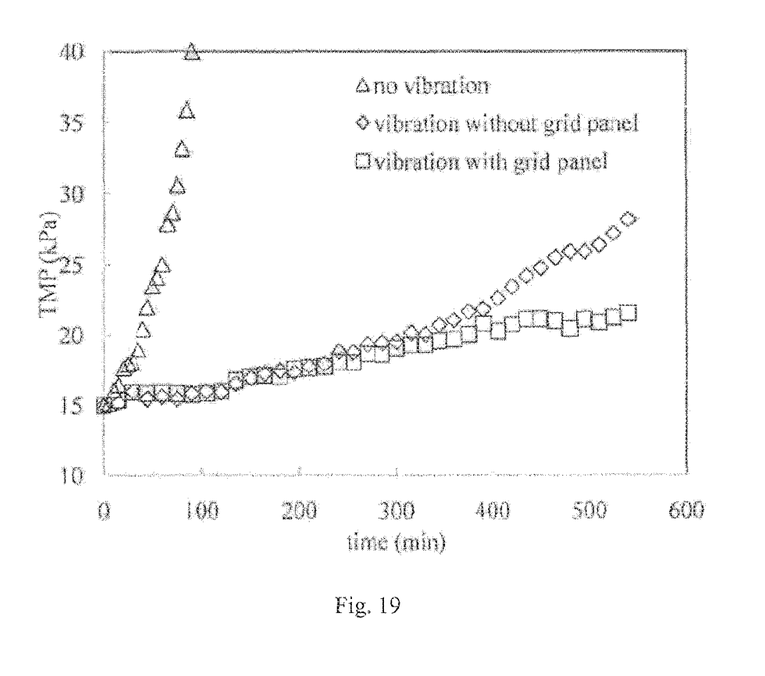
FIG. 19 is a graph of TMP of an experimental membrane filtration module under different vibration relaxation conditions with and without a vibrating panel in 8 g/L mixed liquor.

FIGS. 14 to 19 show the results of experiments conducted with and without vibrating the grid panel 30 for different suspensions. The membrane modules 20 used in these experiments were packed with the same 5×5 fibre pattern with a packing density of 14% and 1% fibre looseness, and the membranes 20 was vibrated transversely. The results shown in FIGS. 14 to 16 are from experiments conducted with continuous vibration, while FIGS. 17 to 19 show results from experiments conducted with vibration relaxation, i.e., under alternating cycles of 1 minute of vibration followed by 1 minute of no vibration. FIG. 14 shows the TMP values of the submerged hollow fibre membranes 20 with continuous vibration of the membranes 20 with and without the vibrating grid panel 30 in 4 g/L yeast suspension at constant permeate flux of 25 LMH. The vibration amplitude was 16 mm and the vibration frequency 2 Hz. The TMP values of the submerged hollow fibre membranes 20 increased from 23.8 kPa to 89 kPa in 110 minutes of membrane filtration without vibration. With transverse vibration of the membranes 20 only, the TMP increased to 96.6 kPa in 235 minutes of filtration. With vibration of both the membranes 20 and the grid panel 30, TMP increased to 79 kPa in 325 minutes of filtration. From the results, it can be concluded that by performing filtration with the vibrating grid panel 30, additional membrane fouling can be reduced in the yeast suspension.

FIG. 15 shows the TMP values of the submerged hollow fibre membranes 20 with continuous vibration of the membranes 20 with and without the grid panel 30 in 4 g/L mixed liquor suspension. The vibration amplitude was 16 mm and the vibration frequency 1 Hz, with a constant permeate flux of 25 LMH. The TMP values of the submerged hollow fibre membranes 20 increased from 15 kPa to 38.7 kPa in 80 minutes of membrane filtration without vibration. With transverse vibration of the membranes 20 only, the TMP increased to 29.7 kPa in 420 minutes of filtration. With vibration of both the membranes 20 and the grid panel 30, TMP increased to 17.9 kPa in 375 minutes of filtration. As can be observed, when performing filtration with the vibrating grid panel 30, the TMP remained nearly constant for 8 hours of filtration in the mixed liquor suspension.

FIG. 16 shows the TMP values of the submerged hollow fibre membranes 20 with continuous vibration of the membranes 20 with and without the vibrating grid panel 30 in a suspension of higher concentration, i.e., 8 g/L mixed liquor suspension. The vibration amplitude was 16 mm, and the vibration frequency 1 Hz, with a constant permeate flux of 25 LMH. The TMP values of the submerged hollow fibre membranes 20 increased from 15 kPa to 40 kPa in 90 minutes of filtration without vibration. With transverse vibration of the membranes 20 only, the TMP increased to 22.6 kPa in 540 minutes of filtration. With vibration of both the membranes 20 and the grid panel 30, TMP increased to 16.9 kPa in 540 minutes of filtration. As can be concluded, when performing filtration with the vibrating grid panel 30, there was only a very limited TMP increase for 9 hours of filtration in the higher concentration of mixed liquor.

FIG. 17 shows the TMP values of the submerged hollow fibre membranes 20 with vibration relaxation of the membranes 20 with and without the vibrating grid panel 30 in a 4 g/L yeast suspension. As mentioned above, vibration relaxation refers to continuous alternating of vibration with relaxation (no vibration), and in the experiment conducted, the vibration and relaxation times were each 1 minute. The vibration amplitude was 16 mm, and the vibration frequency 2 Hz with a constant permeate flux of 25 LMH. The TMP values of the submerged hollow fibre membranes 20 increased from 23.8 kPa to 89 kPa in 110 minutes of filtration without vibration. With transverse vibration relaxation of the membranes 20 only, the TMP increased to 59.8 kPa in 65 minutes of filtration. With vibration relaxation of both the membranes 20 and the grid panel 30, the TMP increased to 79.1 kPa in 195 minutes of filtration. As can be concluded, when performing filtration with vibration relaxation, membrane filtration could be improved with vibration relaxation of the grid panel 30 in the yeast suspension as well.

FIG. 18 illustrates the TMP values of the submerged hollow fibre membranes 20 with vibration relaxation with and without the vibrating grid panel 30 in 4 g/L mixed liquor suspension. The vibration and relaxation time was both 1 minute. The vibration amplitude was 16 mm, and the vibration frequency 1 Hz with constant permeate flux of 25 LMH. The TMP values of the submerged hollow fibre membranes 20 increased from 15 kPa to 38.7 kPa in 80 minutes of membrane filtration without vibration. With vibration relaxation of the membranes 20 only, the TMP increased to 26.2 kPa in 555 minutes of filtration. With vibration relaxation of both the membranes 20 and the grid panel 30, the TMP increased to 17.8 kPa in 525 minutes of filtration. This indicated that with vibration relaxation, the vibrating grid panel 30 could reduce fouling of the submerged hollow fibre membrane of real mixed liquor.

FIG. 19 also illustrates the TMP values of the submerged hollow fibre membranes 20 with vibration relaxation with and without the vibrating grid panel 30 with a higher concentration, i.e. 8 g/L of mixed liquor suspension. The vibration and relaxation time was both 1 minute. The vibration amplitude was 16 mm, and the vibration frequency 1 Hz with constant permeate flux of 25 LMH. The TMP values of the submerged hollow fibre membranes 20 increased from 15 kPa to 40 kPa in 90 minutes of filtration without vibration. With vibration relaxation of the membranes 20 only, the TMP increased to 28.1 kPa in 540 minutes of filtration. With vibration relaxation of both the membranes 20 and the grid panel 30, the TMP increased to 21.5 kPa in 540 minutes of filtration. There was thus observed an additional improvement with the use of the grid panel 30 even with vibration relaxation in the higher concentration of mixed liquor.

In summary, the TMP values are all smaller with the VS membrane filtration module 10 for hollow fibre membrane filtration. Compared to TMP values of filtration performed without the vibrating grid panel 30, the TMP values were observed to be all smaller when performing filtration with the vibrating grid panel 30. This suggests or shows that the vibrating grid panel 30 is effective to improve filtration performance of the submerged hollow fibre membrane 20. In addition, with the movement of the grid panel 30, the feed suspension 60 is well mixed and no extra stirring apparatus is needed to make a homogeneous suspension. Moreover, the TMP values in the mixed liquor stayed very low for around 9 hours of filtration with just a small vibration frequency of 1 Hz of the grid panel 30. The use of the vibratory membrane filtration module 10 described above for fouling control thus can eliminate the fouling problem for MBRs without the use of air or biogas sparging. This confirms the importance of the VS membrane module 10 in real industry application.

Typical applications of the membrane filtration module 10 described above are (i) in an anaerobic membrane bioreactor, to produce both stirring and transverse vibration since no air is required, and self-mixing is obtained with the vibration of the hollow fibre membranes 20 and the grid panel 30; (ii) in an aerobic membrane bioreactor, with addition of air injection to oxygenate the bacteria; and (iii) in dewatering of sludge. This invention is particularly directed to relatively large reactors for the microfiltration of suspensions, and capitalizes on the simplicity and effectiveness of the compact configuration. With the present invention, since the membranes 20 are operated under the optimal condition, the energy required for membrane filtration can be reduced. In addition, with the reciprocate movement of the panel 30, stirring of the reactor fluid 60 is induced, thus the use of air or biogas sparging can be eliminated entirely. With the arrangement between the panel 30 and the hollow fibre membrane bundle 20 being particularly controlled with the specially determined separating distance, turbulence generated by the panel 30 improves the fouling control of the membrane filtration in an optimal manner.

Whilst there has been described in the foregoing description exemplary embodiments of the present invention, it will be understood by those skilled in the technology concerned that many variations in details of design, construction and/or operation may be made without departing from the present invention. For example, while it has been described that the panel may have square holes provided in a grid pattern on the panel, other hole configurations may be envisaged, such as circular holes provided in a hexagonal close-pack pattern on the panel.

REFERENCES

Drews, Membrane fouling in membrane bioreactors-Characterisation, contradictions, cause and cures. Journal of Membrane Science 363(2010) 1-28.

S. Judd, The MBR Book, Elsevier, Amsterdam, 2006.

T. Li, A. W. K. Law, M. Cetin, A. G. Fane, Fouling control of submerged hollow fibre membranes by vibrations, Journal of Membrane Science 427 (2013) 230-239.

F. Wicaksana, A. G. Fane, V. Chen, Fibre movement induced by bubbling using submerged hollow fibre membranes, Journal of Membrane Science 271 (2006) 186-195.

L. Xia, A. W. K. Law, A. G. Fane, Hydrodynamic effects of air sparging on hollow fiber membranes in a bubble column reactor, Water Research 47 (2013) 3762-3772.

The invention claimed is:

1. A membrane filtration module configured for use in a filtration reactor, the module comprising:
   hollow fibre membranes configured to perform filtration of feed fluid in the reactor; and
   a vibration mechanism configured to vibrate the hollow fibre membranes to generate shear stresses on the surface of the hollow fibre membranes for reducing fouling of the hollow fibre membranes; and
   a panel provided parallel to the hollow fibre membranes and configured to be vibrated by the vibration mechanism to generate turbulence while reducing splash in the feed fluid for reducing fouling of the hollow fibre membranes, wherein the panel is made of a rigid material and provided with multiple holes therethrough.

2. The membrane filtration module of claim 1, wherein the panel is further configured to be vibrated by the vibration mechanism to generate turbulence for homogenizing the feed fluid such that a stirring apparatus is eliminated from the reactor.

3. The membrane filtration module of claim 1, wherein the panel comprises a projecting hanger plate on each of two opposing edges of the panel, each hanger plate being configured for connecting the panel to the vibration mechanism and to the ends of the hollow fibre membranes.

4. The membrane filtration module of claim 1, wherein the panel is at a distance of between 0 and 100 cm from the hollow fibre membranes for fouling control.

5. The membrane filtration module of claim 1, wherein the vibration mechanism is configured to generate transverse vibrations in the panel.

6. The membrane filtration module of claim 1, wherein the vibration mechanism is configured to generate transverse vibrations in the hollow fibre membranes.

7. The membrane filtration module of claim 1, wherein the vibration mechanism comprises a vibration bar configured to transmit vibrations generated by an external vibration drive to the membrane filtration module.

8. The membrane filtration module of claim 1, wherein opposite ends of the fibres of the hollow fibre membranes in the membrane filtration module are placed at a distance apart that is less than the actual length of the fibres such that a looseness is provided in the fibres.

9. The membrane filtration module of claim 1, wherein the reactor is one of: an anaerobic membrane bioreactor and an aerobic membrane bioreactor.

10. A method of membrane filtration, the method comprising:
    vibrating hollow fibre membranes in a reactor while passing feed fluid through the hollow fibre membranes such that shear stresses are generated on the surface of the hollow fibre membranes for reducing fouling of the hollow fibre membranes,
    generating turbulence while reducing splash in the feed fluid for reducing fouling of the hollow fibre membranes by vibrating a panel provided parallel to the hollow fibre membranes while passing the feed fluid through the hollow fibre membranes, the panel being made of a rigid material and provided with multiple holes therethrough.

11. The method of claim 10, further comprising homogenizing the feed fluid to eliminate a stirring apparatus from the reactor by vibrating the panel.

12. The method of claim 10, wherein the panel is vibrated with a transverse vibration.

13. The method of claim 10, wherein the hollow fibre membranes are vibrated with a transverse vibration.

* * * * *